United States Patent
Burkhart et al.

(10) Patent No.: US 11,455,518 B2
(45) Date of Patent: Sep. 27, 2022

(54) USER CLASSIFICATION FROM DATA VIA DEEP SEGMENTATION FOR SEMI-SUPERVISED LEARNING

(71) Applicant: ADOBE INC., San Jose, CA (US)

(72) Inventors: Michael Burkhart, San Jose, CA (US); Kyle Shan, Palo Alto, CA (US)

(73) Assignee: ADOBE INC., San Jose, CA (US)

( * ) Notice: Subject to any disclaimer, the term of this patent is extended or adjusted under 35 U.S.C. 154(b) by 524 days.

(21) Appl. No.: 16/681,239

(22) Filed: Nov. 12, 2019

(65) Prior Publication Data

US 2021/0142152 A1    May 13, 2021

(51) Int. Cl.
*G06N 3/04*    (2006.01)
*G06K 9/62*    (2022.01)
*G06F 17/18*   (2006.01)
*G06N 20/10*   (2019.01)

(52) U.S. Cl.
CPC .......... *G06N 3/0472* (2013.01); *G06F 17/18* (2013.01); *G06K 9/6267* (2013.01); *G06N 3/0454* (2013.01); *G06N 20/10* (2019.01)

(58) Field of Classification Search
CPC .... G06N 3/0472; G06N 3/0454; G06N 20/10; G06N 3/08; G06F 17/18; G06K 9/6267; G06K 9/6234; G06K 9/6259; G06K 9/6269; G06K 9/6281
See application file for complete search history.

(56) References Cited

U.S. PATENT DOCUMENTS

| | | | |
|---|---|---|---|
| 8,527,432 B1 * | 9/2013 | Guo | G06N 20/10 706/14 |
| 10,922,609 B2 * | 2/2021 | Pal | G06N 3/0454 |
| 11,106,715 B1 * | 8/2021 | Ju | G06F 16/35 |
| 2007/0239642 A1 * | 10/2007 | Sindhwani | G06N 3/08 706/25 |

(Continued)

OTHER PUBLICATIONS

Chapelle, O., et al., "Semi-Supervised Classification by Low Density Separation", Proceedings of the Tenth International Workshop on Artificial Intelligence and Statistics, pp. 57-64 (2005).*

(Continued)

*Primary Examiner* — Xuemei G Chen
(74) *Attorney, Agent, or Firm* — F. Chau & Associates, LLC

(57) ABSTRACT

Systems and methods are described for user classification with semi-supervised machine learning. The systems and methods may include receiving user information for a first set of users, receiving survey data for a second set of users wherein the second set of users is a proper subset of the first set of users, training a first neural network and a second neural network based on the second set of users, mapping the user information for the first set of users to the embedding space using the first neural network, predicting category membership propensities for the first set of users using a low-density separation algorithm on the user information for the first set of users mapped to the embedding space, updating the first neural network and the second neural network based on the prediction, and reclassifying the first set of users based on the updated first neural network and the updated second neural network.

20 Claims, 10 Drawing Sheets

(56) References Cited

U.S. PATENT DOCUMENTS

| | | | | |
|---|---|---|---|---|
| 2007/0265991 A1* | 11/2007 | Collobert | ............ | G06K 9/6269 |
| | | | | 706/16 |
| 2009/0204556 A1* | 8/2009 | Weston | ............... | G06K 9/6276 |
| | | | | 706/12 |
| 2017/0364769 A1* | 12/2017 | Sandler | ................ | G06V 30/194 |
| 2019/0005324 A1* | 1/2019 | Anisimovskiy | .......... | G06N 3/08 |
| 2020/0012761 A1* | 1/2020 | El-Baz | ................... | G16B 40/00 |
| 2020/0210808 A1* | 7/2020 | Dong | ..................... | G06N 20/00 |
| 2020/0336397 A1* | 10/2020 | Tedaldi | ................ | G06N 3/0454 |
| 2020/0342359 A1* | 10/2020 | Hu | ......................... | G06N 20/10 |
| 2020/0388029 A1* | 12/2020 | Saltz | .................... | G06K 9/6267 |
| 2020/0410388 A1* | 12/2020 | Liu | ..................... | G06K 9/6256 |
| 2021/0035024 A1* | 2/2021 | Yang | ..................... | G06N 20/10 |

OTHER PUBLICATIONS

Zhuang, et al., "Local Label Propagation for Large-Scale Semi-Supervised Learning", Stanford University, arXiv:1905.11581v1 [cs.CV] May 28, 2019, pp. 1-10.

Collobert, et al., "Large Scale Transductive SVMs", Journal of Machine Learning Research, 7 (2006), pp. 1687-1712.

Iscen, et al., "Label Propagation for Deep Semi-Supervised Learning", pp. 5070-5079.

\* cited by examiner

USER CLASSIFICATION FROM DATA VIA DEEP SEGMENTATION FOR SEMI-SUPERVISED LEARNING

BACKGROUND

The following relates generally to machine learning, and more specifically, to user classification with semi-supervised machine learning.

A variety of machine learning techniques may be used to classify data. For example, supervised learning maps inputs to outputs based on observed input-output pairs (i.e., the ground truth). In other words, supervised learning is based on labeled training data. Each piece of labeled training data includes an input object (e.g., a vector) and a desired output value. A supervised learning algorithm learns from the training data to produce a predictive model that may be used to map new input data for which the output is not known.

By contrast, unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

In some cases, a dataset may include a large amount of unlabeled data, and a smaller amount of labeled data. In this case, neither supervised nor unsupervised learning can take into account everything that is known about the data. Therefore, there is a need in the art for machine learning techniques that utilize both labeled and unlabeled data.

SUMMARY

A method, apparatus, and non-transitory computer-readable medium for user classification with semi-supervised machine learning are described. Embodiments of the method, apparatus, and non-transitory computer-readable medium may receive user information for a first set of users, receive survey data for a second set of users, wherein the second set of users is a proper subset of the first set of users, train a first neural network and a second neural network based on the second set of users, wherein the first neural network maps the user information to an embedding space and the second neural network maps the embedding space to a space of probability vectors, and wherein each vector in the space of probability vectors corresponds to a user's category membership propensity, map the user information for the first set of users to the embedding space using the first neural network, predict category membership propensities for the first set of users using a low-density separation algorithm on the user information for the first set of users mapped to the embedding space, update the first neural network and the second neural network based on the prediction, and reclassify the first set of users based on the updated first neural network and the updated second neural network.

A method, apparatus, and non-transitory computer-readable medium for user classification with semi-supervised machine learning are described. Embodiments of the method, apparatus, and non-transitory computer-readable medium may identify user information for each of a first set of users, select a second set of users, wherein the second set of users is a proper subset of the first set of users, collect additional information for each of the second set of users, segment the second set of users into multiple categories based on the additional information, train a first neural network and a second neural network based on the segmentation of the second set of users, wherein the first neural network maps the user information to an embedding space and the second neural network maps the embedding space to a space of probability vectors corresponding to the multiple categories, map the user information for the first set of users to the embedding space using the first neural network, segment the first set of users into the multiple categories using a low-density separation algorithm, update the first neural network and the second neural network based on the segmentation of the first set of users, and reclassify the first set of users based on the updated first neural network and the updated second neural network.

A method, apparatus, and non-transitory computer-readable medium for user classification with semi-supervised machine learning are described. Embodiments of the method, apparatus, and non-transitory computer-readable medium may identify information for a first set of objects, identify additional information for a second set of objects, wherein the second set of objects is a subset of the first set of objects, classify the second set of objects into multiple categories based on the additional information, train a first neural network and a second neural network based on the segmentation of the second set of objects, wherein the first neural network maps the object information to an embedding space and the second neural network maps the embedding space to a space corresponding to the multiple categories, map the first set of objects to the embedding space using the first neural network, classify the first set of objects into the multiple categories using a low-density separation algorithm based on the mapping, retrain the first neural network and the second neural network based on the classification of the first set of objects, remap the first set of objects to the embedding space using the updated first neural network, reclassify the first set of objects into the multiple categories using the low-density separation algorithm based on the remapping, and retrain the first neural network and the second neural network based on the reclassification of the first set of objects.

DETAILED DESCRIPTION

Figure 1:
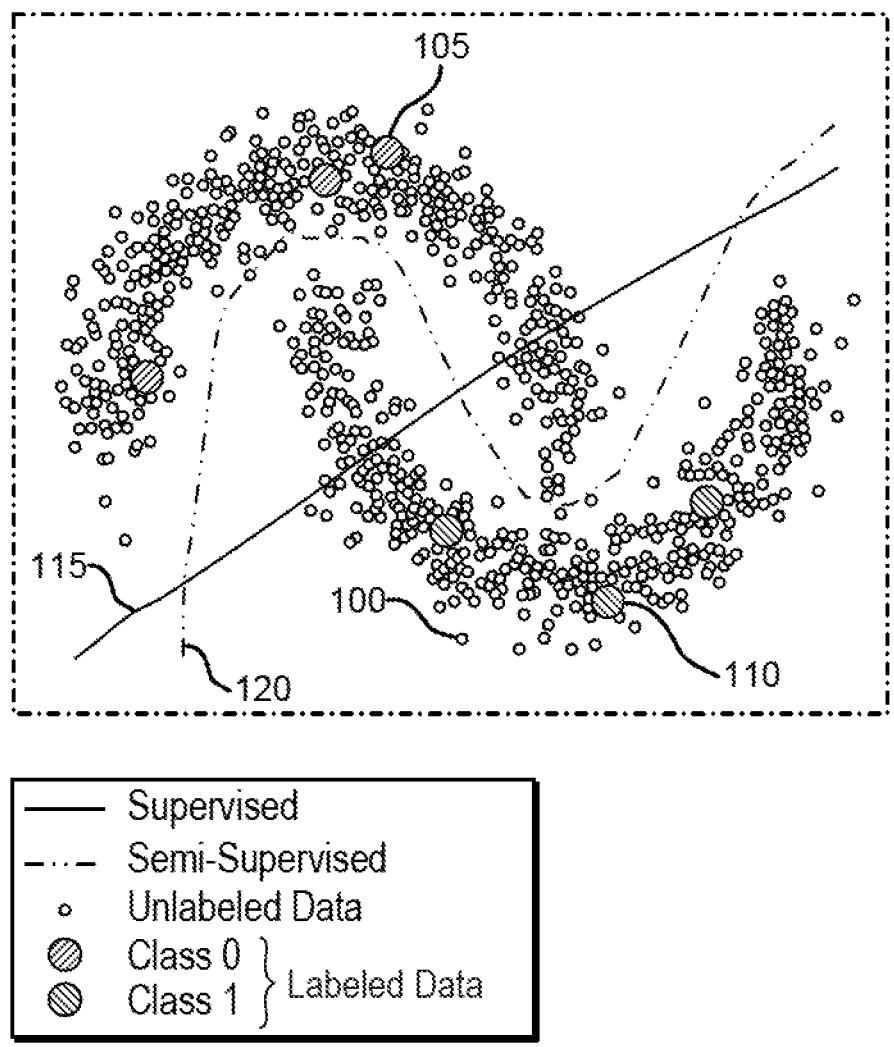
FIG. 1 shows an example of a comparison of supervised and semi-supervised classification according to aspects of the present disclosure.

The present disclosure describes systems and methods for object or user classification using semi-supervised learning. Example embodiments of the present disclosure utilize neural networks trained using labeled data, and separation algorithms that can operate on both labeled and unlabeled data.

Supervised training of neural networks can require a large amount of labeled data, that is, data that includes both the input features and the target output. However, collecting labeled data can be difficult, costly, or time consuming. Therefore, unsupervised methods may be used to cluster unlabeled data into different categories without knowing the target output of the classifier. Unfortunately, unsupervised methods do not always perform as desired. For example, clusters of data that ought to be classified similarly may be separated in the space of input vectors (resulting in different classification). Alternatively, a single cluster of data may include data objects that ought to be classified differently.

Semi-supervised learning is a type of machine learning that falls between supervised learning and unsupervised learning, and can utilize the advantages of both. A semi-supervised learning algorithm may be used on training data where only some of the inputs are labeled. Semi-supervised machine learning may utilize a variety of methods for clustering data including graph-based methods, neural network-based embedding, and low-density separation methods. However, in some cases these methods can provide suboptimal results if the labeled data is of poor quality. For example, if assignment errors are made for some of the labeled data, these errors can be propagated to the unlabeled data, which may significantly undermine the labeling process.

Thus, embodiments of the present disclosure describe systems and methods for semi-supervised learning based on training a neural network using labeled data and then using a low-density separation algorithm, such as a transductive support vector machine (TSVM), to apply labels to the unlabeled data. The neural network may then be retrained one or more times using the newly labeled data. Decision boundaries are therefore iteratively refined to discriminate between class labels. By re-learning decision boundaries at each iterative step, the algorithm can recover from mistakes in early iterations (i.e., from mislabeled data in the original training set).

The following terminology is used throughout the present disclosure:

The term "labeled data" refers to data that includes both input features and the target output. For example, in one embodiment of the present disclosure, the labeled data refers to users (and the associated user information) that have been classified into various categories based on survey results. The labeled data refers to the combination of the user information and the classification. While the classification is based on the survey results, labeled data need not include the actual survey results.

The term "unlabeled data" refers to data that does not include a known label. For example, in the user survey example, it might be difficult or expensive to encourage users to take a survey. Therefore, survey information may only be available for a small portion of the user population, and the remaining users (and their associated information) comprise unlabeled data.

The term "neural network" refers to hardware or a software that includes a number of connected nodes. Each connection, or edge, may transmit a signal from one node to another. When a node receives a signal, it can process the signal and then transmit the processed signal to other connected nodes. Each node and edge may be associated with one or more node weights that determine how the signal is processed and transmitted. During the training process, these weights may be adjusted to improve the accuracy of the result (i.e., by minimizing a loss function which corresponds in some way to the difference between the current result and the target result).

The term "embedding space" refers to an intermediate output of a neural network in which input features (e.g., user information) is encoded into a vector space. In some cases, the embedding space may have a fewer number of dimensions than the input features. Furthermore, the embedding space may represent the input features in a way such that input objects (e.g., users) that are to be classified with the same label are located nearby to each other in the embedding space.

According to embodiments of the present disclosure, a first portion of a neural network (i.e., the first neural network) maps the input features to the embedding space and a second portion of the neural network (i.e., the second neural network) maps the embedding space to a space of probability vectors.

The term "probability vector" refers to a probability distribution over a set of classification labels. For example, a neural network may output a vector where each term in the vector represents the probability that the input should be classified with a particular label. In some cases, the values in the probability vector comprise positive real numbers that sum to 1.

The term "low-density separation algorithm" refers to a method of applying labels to unlabeled data by extrapolating from labeled data. For example, a low-density separation algorithm may find a decision boundary that separates one class of labeled data from another. Low-density separation methods may also be referred to as maximum-margin classifiers. For example, a transductive support vector machine (TSVM) may be considered a low-density separation method.

According to embodiments of the present disclosure, a low-density separation algorithm may be applied to data (e.g., user information) that has been mapped into the embedding space using a first neural network. This may provide a large amount of labeled data that may then be used to retrain the neural network (both the first neural network and the second neural network). The process of applying the first neural network to the data, classifying the data using the low-density separation algorithm, and then retraining the neural network may be repeated multiple times.

FIG. 1 shows an example of a comparison of supervised and semi-supervised classification according to aspects of the present disclosure. The example shown includes unlabeled data 100 and labeled data including a first class 105 and a second class 110. The example also shows the result of supervised classification 115 and semi-supervised classification 120. Unlabeled data 100, first class 105, and second class 110 may be examples of, or include aspects of, the corresponding elements described with reference to FIG. 6.

Embodiments of the present disclosure provide systems and methods to perform semi-supervised learning that returns predicted probabilities of a user belonging to a segment, given the user's features. Semi-supervised learning uses unlabeled data 100 to create an improved classifier when compared to supervised training using labeled data alone. For example, consider the segmentation of a group of users based on user profiles and usage histories. A small fraction of users can be surveyed to determine how the users should be classified (e.g., to create the first class 105 and the second class 110 of labeled data). With this information, a supervised model that predicts a user's label from their features can be created. Semi-supervised learning uses both classified and unclassified users' features to create improved labels.

Embodiments of the present disclosure iterate between refining a latent representation for users and performing a segmentation task (e.g., using a low-density separation algorithm). Embodiments of the present disclosure can be used to classify thousands of users, content, or assets from a relatively small number of examples.

According to one example which will be referenced throughout the disclosure, the initial training set includes a small set of labeled data $$\mathcal{D}_0 = \{(x_1,y_1),(x_2,y_2),\ldots,(x_\ell,y_\ell)\} \quad (1)$$

of vector-valued features $x_i \in \mathbb{R}^d$ and discrete-valued labels $y_i \in \{1,\ldots,c\}$, for $1 \leq i \leq \ell$, The example also takes as input a set of unlabeled features:

$$\mathcal{D}_1 = \{x_{\ell+1}, x_{\ell+2}, \ldots, x_{\ell+n}\}. \quad (2)$$

Supervised learning can be performed on the labeled dataset $\mathcal{D}_0$ to learn a general classifier to predict y for any x and then apply this classifier to $\mathcal{D}_1$. Semi-supervised methods assign labels to the $x_i$ in $\mathcal{D}_1$. Additional assumptions can be made about the distribution of the x-data; i.e., $\{x:(x,y) \in \mathcal{D}_0\} \cup \mathcal{D}_1$. Features sharing the same label may be clustered such that a smooth decision boundary separates differently labeled features (i.e., the features lie on a lower-dimensional manifold within $\mathbb{R}^d$). Thus, semi-supervised methods that leverage data from $\mathcal{D}_1$ may achieve improved performance compared to supervised methods that use $\mathcal{D}_0$ alone.

For example, users (or potential users) of a particular product may be segmented based on work habits, artistic motivations, and relationships. Data may be gathered using a detailed survey sent to a select group of users. A segmentation of users may be developed from the responses of the survey (e.g., using any suitable unsupervised learning model). The segment labels are the y variable (i.e., the user categories). Information is also collected for each of the users that have not taken the survey (e.g., by gathering usage and profile data). The usage and profile data available for the users become the x variable $\mathcal{D}_0$ consists of feature-label pairs for surveyed users and $\mathcal{D}_1$ consists of features for unsurveyed users (without labels). While the present example applies to users of a product, semi-supervised may be used across a wide range of applications, including computer vision, speech understanding, and protein sequence classification.

In addition to utilizing a supervised neural network, semi-supervised machine learning may utilize a variety of methods for clustering data including graph-based methods, neural network-based embedding, and low-density separation methods.

Graph-based methods calculate pairwise similarities between labeled and unlabeled x's and allow labeled x's to pass labels to unlabeled neighbors. Examples of graph-based methods may include graph min-cuts and Markov random walks. Additionally or alternatively, label propagation techniques may be used to form an $(\ell+u) \times (\ell+u)$ dimensional transition matrix T with transition probabilities proportional to similarities between x's and an $(\ell+u) \times c$ dimensional matrix Y of class probabilities, and iteratively set $Y \leftarrow TY$, row-normalize the probability vectors, and reset the rows of probability vectors corresponding to the already-labeled elements of $\mathcal{D}_0$. Additionally or alternatively, label spreading may be used to normalize the transition matrix with a clamping parameter to enable a level of uncertainty for the labels in $\mathcal{D}_0$.

As described above, graph-based methods calculate the similarities between the labeled and unlabeled x's in the joint dataset $\mathcal{D}_0 \cup \mathcal{D}_1$. In some cases, a computed measure of similarity or difference between two x-values accurately reflects the true underlying similarity or difference between two users. However, graph-based methods may be insufficient when the x's are high-dimensional, i.e., d>>1. That is, Euclidean distance between vectors of high-dimensional features may not be the best proxy for user similarity. Since the Gaussian kernel is a monotonic function of Euclidean distance, kernelized methods such as label propagation and label spreading may also be less effective when x's are high dimensional.

Thus, a variety of similarity measures may be used for semi-supervised learning, including cluster kernels, random walk kernels, and transforms of graph kernels. Similarly, variational autoencoders (VAE) are used to encode x-values in a bottlenecked space so that the x-values can be accurately reconstructed.

Additionally, or alternatively, neural embedding-based methods may be used to generate features to perform label propagation. For example, a neural network-based classifier may be trained on the supervised dataset to embed the x-values into an intermediate feature space. Label propagation in the feature space may then repeatedly alternate with training the neural network classifier using weighted predictions from the label propagation.

As an alternative to graph-based methods and neural embedding, low-density separation methods may be used to find a decision boundary that separates one class of labeled data from another. Low-densityseparation methods may also be referred to as maximum-margin classifiers. For example, a transductive support vector machine (TSVM) may be considered a low-density separation method.

Certain embodiments of the present disclosure describe a clustering/low-density separation approach to semi-supervised learning. Example embodiments iteratively refine decision boundaries to discriminate between class labels. By re-learning decision boundaries at each iterative step, the algorithm can recover from mistakes in early iterations. One failure mode of semi-supervised methods stems from making a few false label assignments early in the iterative process, then using the mislabeled points to pass false labels to neighboring data.

For example, in pseudo-labeling, the algorithm augments the underlying training set $D_0$ with pairs $(x_i, \hat{y}_i)$ for $x_i \in D_1$ and predicted labels $\hat{y}_i$ for which the model is confident in the iteration. Similar error-reinforcement problems can occur with boosting. A few confident, but inaccurate, labels that occur in the first few steps of the algorithm can affect the labeling process.

Therefore, by creating an embedding $f: \mathbb{R} \to \mathbb{R}^m$ (i.e., from feature space into an embedding space) and applying linear separation to embedded points, a distance metric $\kappa: \mathbb{R}^d \times \mathbb{R}^d \to \mathbb{R}_{\geq 0}$ may be iteratively refined. The linear decision boundaries produced in $\mathbb{R}^m$ correspond to nonlinear boundaries for the original x's in $\mathbb{R}^d$. In some cases, a deep neural network may be used to embed features for Gaussian process regression.

Figure 2:
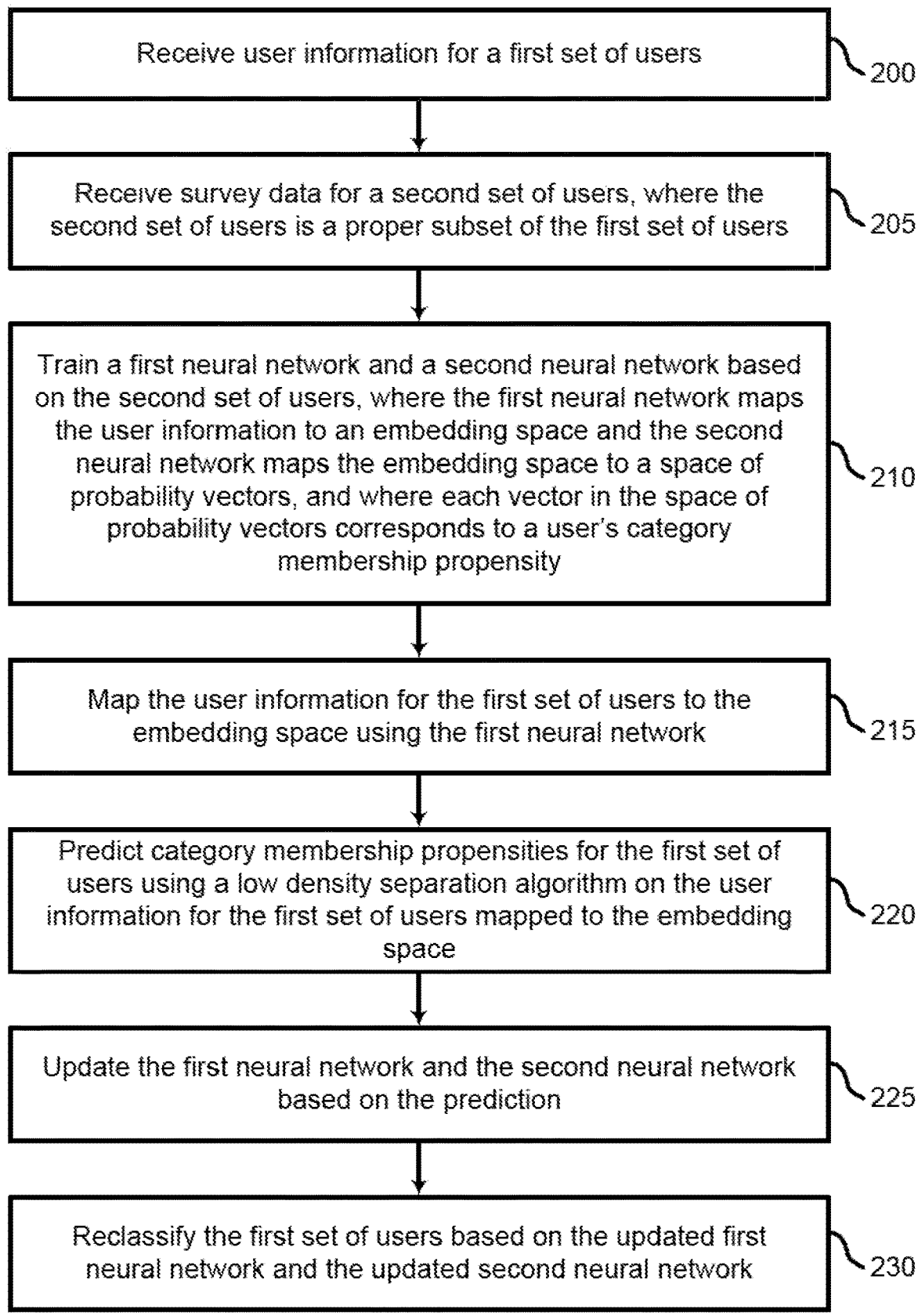
FIG. 2 shows an example of a process for user classification with semi-supervised machine learning according to aspects of the present disclosure.

FIG. 2 shows an example of a process for user classification with semi-supervised machine learning according to aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein. An example of a semi-supervised learning model is described in FIG. 7.

At operation 200, the system receives user information for a first set of users. In some cases, the operations of this step may refer to, or be performed by, an unlabeled data component as described with reference to FIG. 9. An example of a process for receiving user information for a first set of users is described in FIG. 3.

At operation 205, the system receives survey data for a second set of users, where the second set of users is a proper subset of the first set of users. In some cases, the operations of this step may refer to, or be performed by, a labeled data component as described with reference to FIG. 9. An example of a process for receiving the survey data is described in FIG. 4.

At operation 210, the system trains a first neural network and a second neural network based on the second set of users. The first neural network maps the user information to an embedding space and the second neural network maps the embedding space to a space of probability vectors. Each vector in the space of probability vectors corresponds to a user's category membership propensity. In some cases, the operations of this step may refer to, or be performed by, a training component as described with reference to FIG. 9. An example of a process for training a first neural network and a second neural network is described in FIG. 5.

For example, a neural network embedding $f: \mathbb{R}^d \to \mathbb{R}^m$ (i.e., the first neural network) may be used to map the x-data for different y-labels. A network $g: \mathbb{R}^m \to \mathbb{P}^c$ (i.e., the second neural network, initialized as the initial layers from an autoencoder for the x-data) maps the y-labels to the space of c-dimensional probability vectors, $\mathbb{P}^c$. That is, a probabilistic framework may be used for distinguishing the categories or labels. Thus, optimization of $g \cdot f$ on the labeled dataset $\mathcal{D}_0$ may be used to classify the data in $\mathbb{R}^d$ (e.g., the original user information). In some cases, the categories corresponding to each $y_i$ may be one-hot encoded.

At operation 215, the system maps the user information for the first set of users to the embedding space using the first neural network. In some cases, the operations of this step may refer to, or be performed by, a first neural network as described with reference to FIGS. 7, 9, and 10. For example, the user information for the first set of users may be mapped using the function $f$ (but not $g$).

At operation 220, the system predicts category membership propensities for the first set of users using a low-density separation algorithm on the user information for the first set of users mapped to the embedding space. In some cases, the operations of this step may refer to, or be performed by, a separation component as described with reference to FIG. 9. An example of a low-density separation algorithm is described in FIG. 6.

For example, the x-data may be mapped as a one-vs.-rest TSVM for each class on the embedded data to learn class propensities for each unlabeled data point. In one-vs.-rest TSVM, separation boundaries are determined between each category and every other category. Thus, the training data is augmented with the $x_i$ from $\mathcal{D}_1$ paired with the propensities returned and used to train the neural network for one or more additional epochs.

At operation 225, the system updates the first neural network and the second neural network based on the prediction. In some cases, the operations of this step may refer to, or be performed by, a training component as described with reference to FIG. 9.

This may be repeated for several iterations to improve embedding for increased TSVM separation, which upon further training yields further improvements to embedding. Thus, the first neural network $f$ provides an improved embedding for differentiating between classes, and the second neural network $g$ provides an improved network for classifying the embedded data.

At operation 230, the system reclassifies the first set of users based on the updated first neural network and the updated second neural network. In some cases, the operations of this step may refer to, or be performed by, a classification component as described with reference to FIGS. 9 and 10.

In other words, upon completion a neural network $g \cdot f$ is returned, mapping x-values to class/label propensities that can easily be applied to $\mathcal{D}_1$. At each iteration of the segmentation algorithm, the labels are reinitialized for the unlabeled points. This allows the semi-supervised TSVM algorithm to provide inferences using the new embedding of the x-data alone. In this way, it is possible to recover from mistakes in labeling that occurred in the iterations of the algorithm.

As an example, the algorithm below provides one method of performing the semi-supervised machine learning described herein:

---

Algorithm 1: Deep Segmentation

Data: labeled dataset $\mathcal{D}_0$ and unlabeled dataset $\mathcal{D}_1$
Result: probabilistic predictions for the labels in $\mathcal{D}_1$
Initialize a multilayer neural network $f_\theta : \mathbb{R}^d \to \mathbb{R}^m$ with trainable parameters $\theta$;
Initialize a neural network $g_\psi : \mathbb{R}^m \to \mathbb{P}^c$ with trainable parameters $\Psi$;
Obtain $\theta_0, \Psi_0$ by training to minimize sparse categorical cross entropy between $h(y_i)$ and $g_\psi(f_\theta(x_i))$ for $(x_i, y_i) \in \mathcal{D}_0$;
for t = 1 ... T do
| Compute $\tilde{\mathcal{D}}_0 = \{(f_{\theta_{t-1}}(x), y) : (x, y) \in \mathcal{D}_0\}$ and
|   $\tilde{\mathcal{D}}_1 = \{f_{\theta_{t-1}}(x) : x \in \mathcal{D}_1\}$;
| Perform one-vs.-rest TSVM training on $\tilde{\mathcal{D}}_0$ and $\tilde{\mathcal{D}}_1$ to obtain
|   predicted probabilities $\hat{p}_i$, i = $\ell$ + 1 ... $\ell$ + u for labels for
|   the $x_i$ in $\mathcal{D}_1$ and let $\tilde{\mathcal{D}}_1 = \{(x_i, \hat{p}_i)\}$;
| Obtain $\theta_t, \Psi_t$ by contiuing to optimize $g_\psi \circ f_\theta$, using $\mathcal{D}_0 \cup \tilde{\mathcal{D}}_1$;
end
return an exponential moving average of the probabilistic predictions $g_\psi, (f_\theta, (x_i))$ for $x_i \in \mathcal{D}_0$.

---

Figure 3:
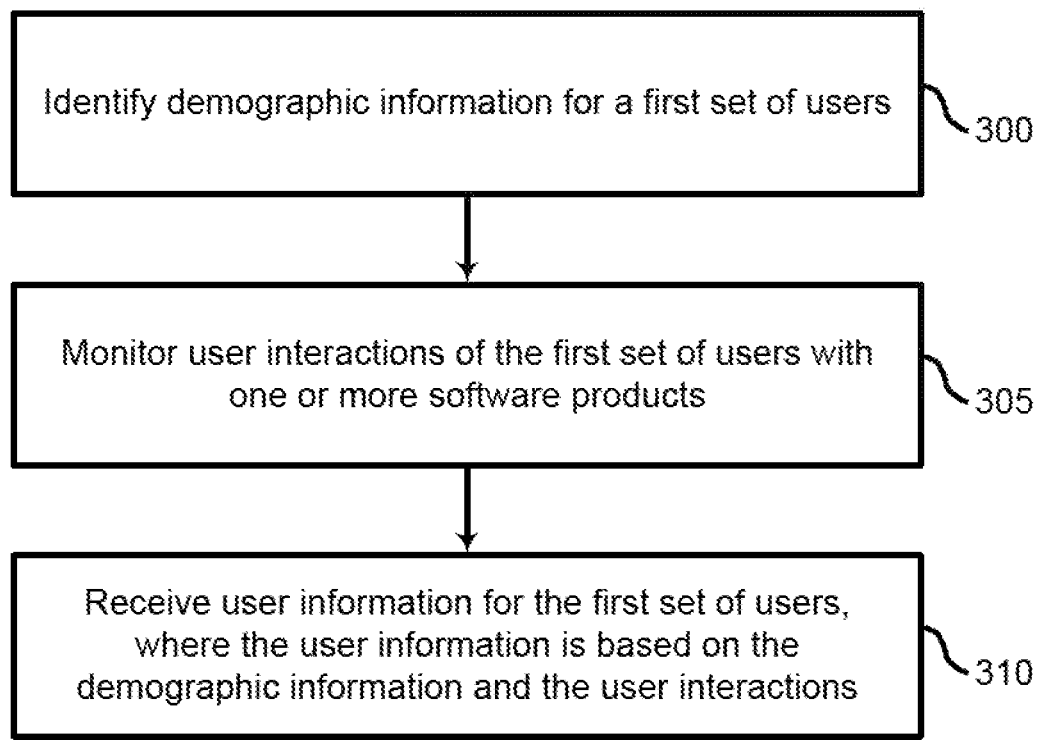
FIG. 3 shows an example of a process for receiving user information for a first set of users according to aspects of the present disclosure.

FIG. 3 shows an example of a process for receiving user information for a first set of users according to aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 300, the system identifies demographic or profile information for a first set of users. In some cases, the operations of this step may refer to, or be performed by, an unlabeled data component as described with reference to FIG. 9.

At operation 305, the system monitors user interactions of the first set of users with one or more software products. For example, users may be monitored while using a video game, photo editing software, marketing software, or any other software application. In some cases, the operations of this step may refer to, or be performed by, an unlabeled data component as described with reference to FIG. 9.

At operation 310, the system receives user information for the first set of users, where the user information is based on the demographic information and the user interactions. In some cases, the operations of this step may refer to, or be performed by, an unlabeled data component as described with reference to FIG. 9.

Figure 4:
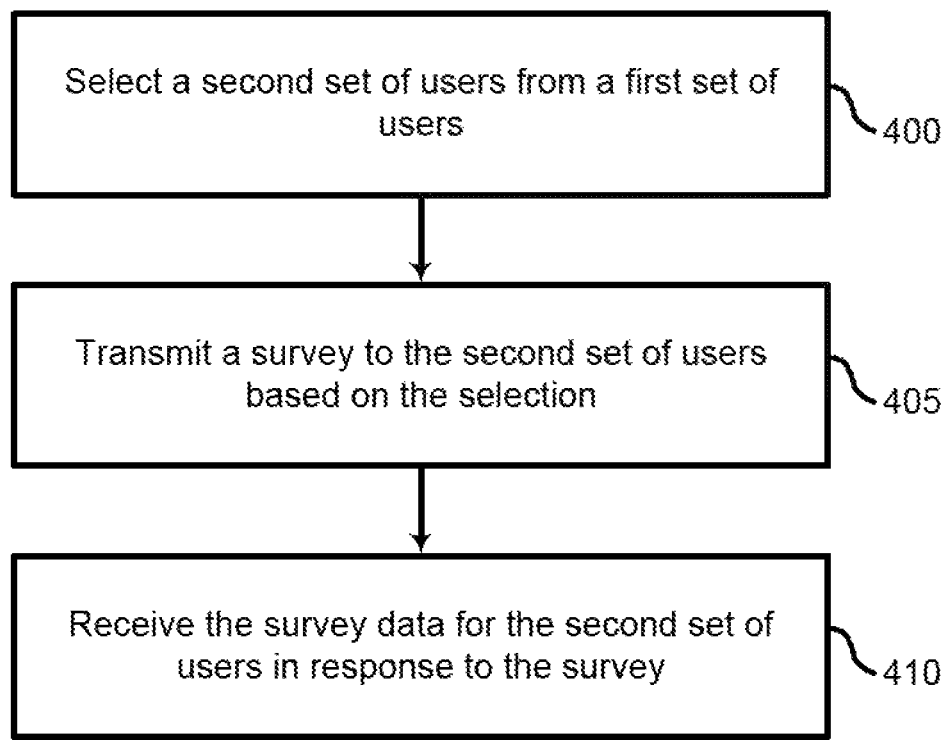
FIG. 4 shows an example of a process for receiving the survey data according to aspects of the present disclosure.

FIG. 4 shows an example of a process for receiving the survey data according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 400, the system selects a second set of users from a first set of users. In some cases, the operations of this step may refer to, or be performed by, a labeled data component as described with reference to FIG. 9. In some examples, the second set of users is selected randomly.

At operation 405, the system transmits a survey to the second set of users based on the selection. In some cases, the operations of this step may refer to, or be performed by, a labeled data component as described with reference to FIG. 9.

At operation 410, the system receives the survey data for the second set of users in response to the survey. In some cases, the operations of this step may refer to, or be performed by, a labeled data component as described with reference to FIG. 9.

Figure 5:
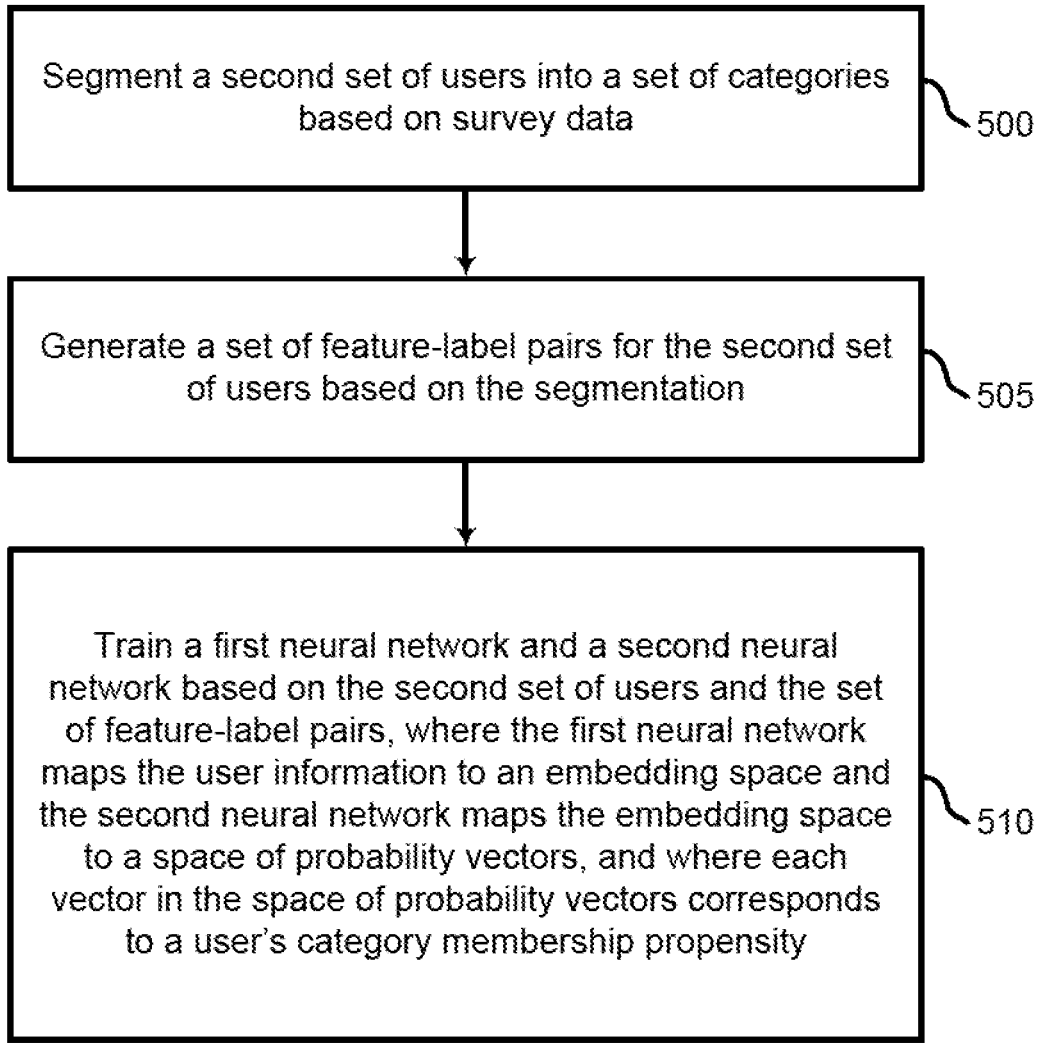
FIG. 5 shows an example of a process for training a first neural network and a second neural network according to aspects of the present disclosure.

FIG. 5 shows an example of a process for training a first neural network and a second neural network according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 500, the system segments a second set of users into a set of categories based on survey data. In some cases, the operations of this step may refer to, or be performed by, a labeled data component as described with reference to FIG. 9.

At operation 505, the system generates a set of feature-label pairs for the second set of users based on the segmentation. In some cases, the operations of this step may refer to, or be performed by, a labeled data component as described with reference to FIG. 9.

At operation 510, the system trains a first neural network and a second neural network based on the second set of users and the set of feature-label pairs. The first neural network maps the user information to an embedding space and the second neural network maps the embedding space to a space of probability vectors. Each vector in the space of probability vectors corresponds to a user's category membership propensity. In some cases, the operations of this step may refer to, or be performed by, a training component as described with reference to FIG. 9.

Figure 6:
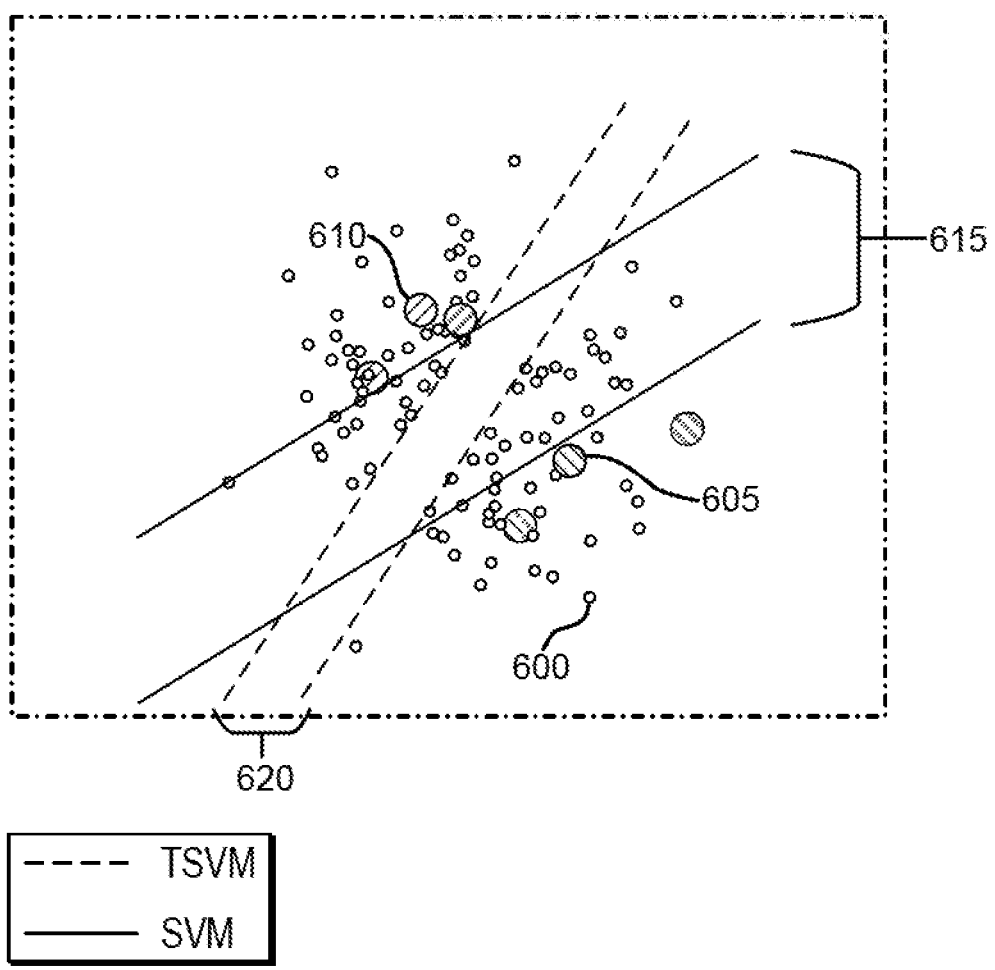
FIG. 6 shows an example of separation algorithms according to aspects of the present disclosure.

FIG. 6 shows an example of separation algorithm according to aspects of the present disclosure. The example shown includes unlabeled data 600, first class 605, second class 610, support vector machine (SVM) classification 615, and transductive support vector machine (TSVM) classification 620. A low-density separation algorithm may comprise a one-vs.-rest TVSM that differentiates each label or category from every other label or category. Unlabeled data 600, first class 605, and second class 610 may be an example of, or include aspects of, the corresponding element or elements described with reference to FIG. 1.

In general, a separation algorithm is used to separate unlabeled data 600 (or a combination of labeled and unlabeled data) into multiple clusters or categories. In some examples, this is accomplished by defining a boundary hyperplane in the feature space (or embedding space) that separates one category from the others. In other examples, multiple hyperplanes or other shapes may be used as separation boundaries.

In some separation algorithms (i.e., SVM) all data is treated equally, such that the boundary region may be empty of datapoints. However, in other separation algorithms (such as in TSVM) a penalty may be applied for unlabeled data points in the separation region, but they are not entirely prevented from falling in the separation region. In other words, more weight or importance may be applied to the labeled data points when determining the separation boundary.

Figure 7:
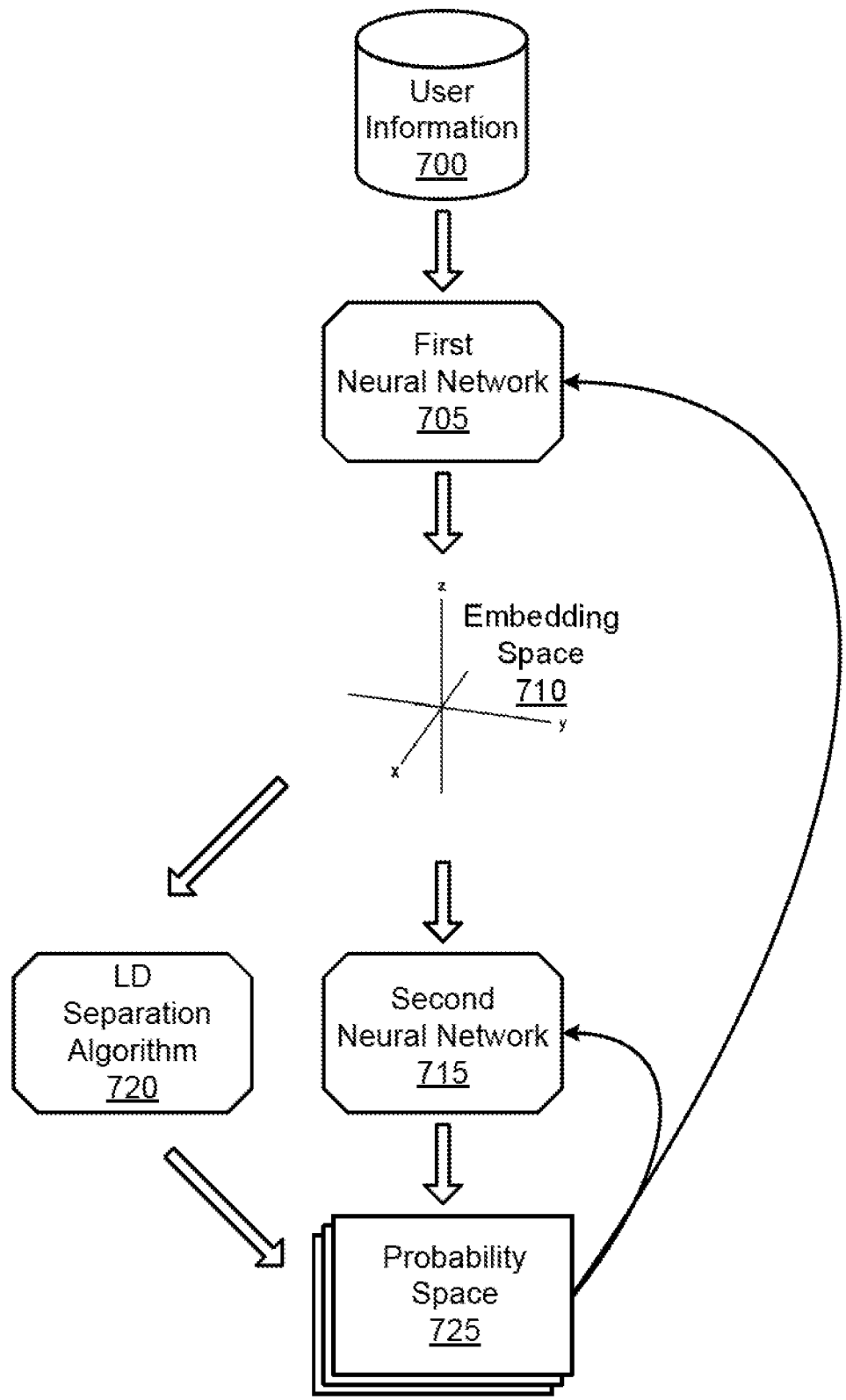
FIG. 7 shows an example of a semi-supervised learning model according to aspects of the present disclosure.

FIG. 7 shows an example of a semi-supervised learning model according to aspects of the present disclosure. The example shown includes user information 700, first neural network 705, embedding space 710, second neural network 715, low-density separation algorithm 720, and probability space 725.

First neural network 705 may map the user information 700 for the first set of users to the embedding space 710. In some examples, the first neural network 705 includes a two-layer network with hyperbolic tangent activation. In some examples, the embedding space 710 includes fewer dimensions than the user information 700.

In another example, first neural network 705 may map a first set of objects to the embedding space 710 using the first neural network 705. An updated first neural network 705 may also remap the first set of objects to the embedding space 710. First neural network 705 may be an example of, or include aspects of, the corresponding element or elements described with reference to FIGS. 9 and 10.

Second neural network 715 maps elements of the embedding space to the probability space 725 (i.e., a space of probability vectors over a set of categories or labels). Second neural network 715 may also be an example of, or include aspects of, the corresponding element or elements described with reference to FIGS. 9 and 10.

Low-density separation algorithm 720 may also map elements of the embedding space to the probability space 725. In other cases, low-density separation algorithm 720 simply applies a label to objects or users in the embedding space. Low-density separation algorithm 720 may be an example of, or include aspects of, the corresponding element or elements described with reference to FIG. 10.

Initially, the first neural network 705 and the second neural network 715 are trained using labeled data. Then additional data may be mapped to the embedding space 710 using the first neural network 705, after which the low-density separation algorithm 720 may be used to label the newly mapped data. Using the low-density separation algorithm 720 instead of simply applying the second neural network 715 may take advantage of clustering within the unlabeled data that may not be well represented in the labeled training set. Once the full data set is labeled using the low-density separation algorithm 720, it may be used to retrain the first neural network 705 and the second neural network 715.

Figure 8:
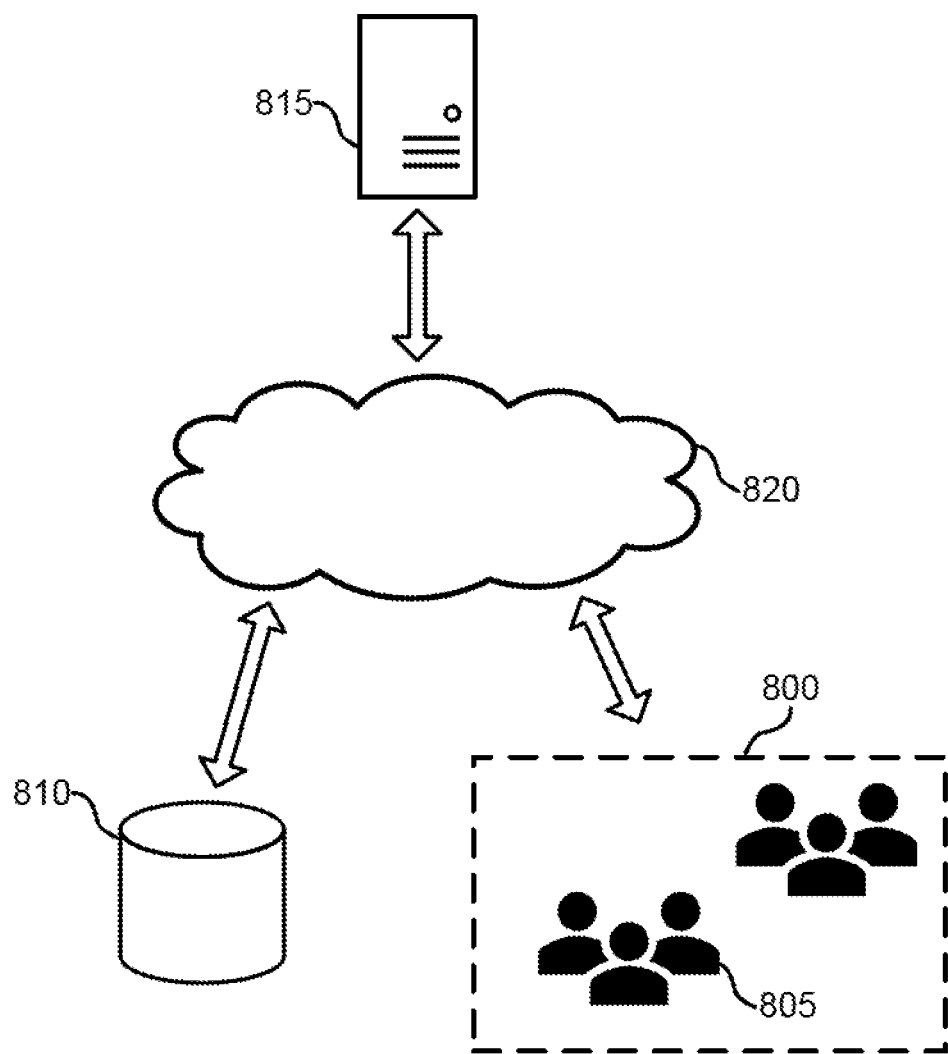
FIG. 8 shows an example of a user classification system according to aspects of the present disclosure.

FIG. 8 shows an example of a user classification system according to aspects of the present disclosure. The example shown includes a first set of users 800, database 810, server 815, and network 820. The first set of users 800 may include a second set of users 805.

The first set of users 800 may represent a large group of users (e.g., users of a software product for which profile and interaction data is available). The second set of users 805 may represent a smaller group of users within the first set of users 800. For example, the second set of users 805 may represent of subset of users that are selected to take a survey to gather additional information.

Information about the first set of users 800 and the second set of users 805 may be stored in the database 810. In some cases, survey results are stored separately from the information about the complete first set of users database 800.

Upon request, the server database 815 may classify the first set of users 800 and the second set of users 805 according to the methods described in the present disclosure. The classification may take into account both the information about the first set of users 800 and the second set of users 805 as well as the survey results (which may be used to create labeled training data for the second set of users 805. Server 815 may be an example of, or include aspects of, the corresponding element or elements described with reference to FIG. 9.

Figure 9:
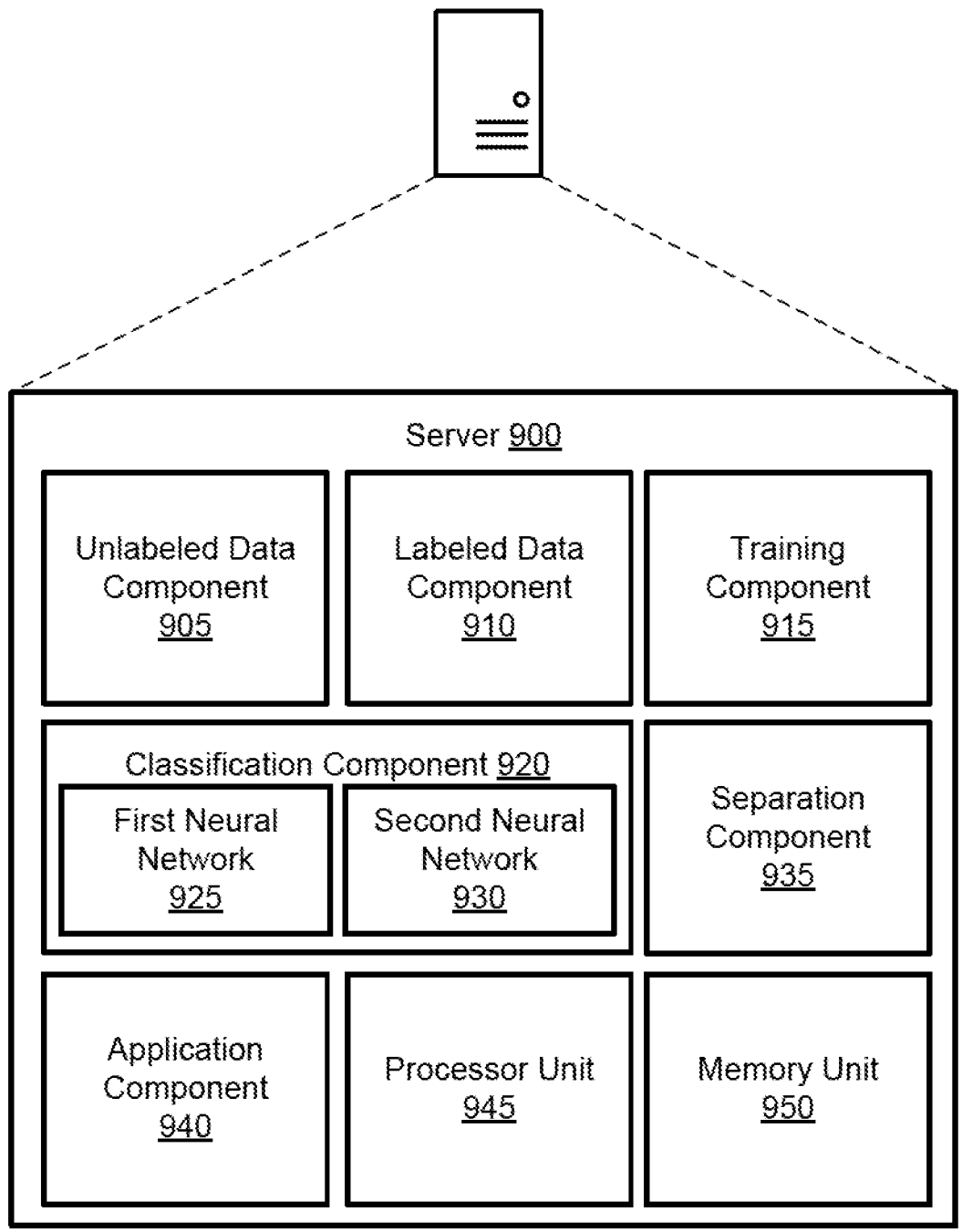
FIG. 9 shows an example of a data classification apparatus according to aspects of the present disclosure.

FIG. 9 shows an example of a data classification apparatus according to aspects of the present disclosure.

Server 900 may be an example of, or include aspects of, the corresponding element or elements described with reference to FIG. 8. Server 900 may include unlabeled data component 905, labeled data component 910, training component 915, first neural network 920, second neural network 925, separation component 930, classification component 935, application component 940, processor unit 945, and memory unit 950.

Unlabeled data component 905 may receive and identify user information for each of a first set of users (or in general, information for a first set of objects). For example, unlabeled data component 905 may identify demographic information and monitor user interactions of the first set of users with one or more software products. The user information may be based on demographic information or user interactions.

Labeled data component 910 may select a second set of users, and then receive or identify survey data for a second set of users (or, in general, additional information about a second set of objects). The second set of users may be a proper subset of the first set of users. Labeled data component 910 may select the second set of users from the first set of users and may transmit a survey to the second set of users based on the selection. Labeled data component 910 may receive the survey data for the second set of users in response to sending the survey and may also segment the second set of users into a set of categories based on the survey data.

Labeled data component 910 may then generate a set of feature-label pairs for the second set of users based on the segmentation. A first neural network 920 and a second neural network 925 may be trained based on the set of feature-label pairs. In some cases, labeled data component 910 may encode category membership using a one-hot encoding, where the set of feature-label pairs is based on the one-hot encoding.

Thus, labeled data component 910 may collect additional information for each of the second set of users and may also segment the second set of users into multiple categories based on the additional information.

In another example, labeled data component 910 may identify additional information for a second set of objects, where the second set of objects is a subset of the first set of objects. Labeled data component 910 may classify the second set of objects into multiple categories based on the additional information and may also randomly select the second set of objects from the first set of objects. Labeled data component 910 may collect additional information based on the random selection. In some examples, the second set of objects is classified using unsupervised machine learning.

Training component 915 may train a classification component 920 including a first neural network 920 and a second neural network 925 based on the second set of users. The first neural network 920 maps the user information to an embedding space and the second neural network 925 maps the embedding space to a space of probability vectors. Each vector in the space of probability vectors may correspond to a user's category membership propensity. Training component 915 may also update the first neural network 920 and the second neural network 925 based on the prediction.

Training component 915 may initialize the first neural network 920, the second neural network 925, or both using Glorot initialization. Training component 915 may also regularize the first neural network 920, the second neural network 925, or both using Tikhonov regularization. Training component 915 may train the first neural network 920 by minimizing Kullback-Leibler divergence between a true distribution and an inferred distribution from the second neural network 925.

Training component 915 may also train the first neural network 920 and the second neural network 925 by adjusting parameters of the first neural network 920 and the second neural network 925 using an Adam optimizer. Training component 915 may repeatedly alternate between training the first neural network 920 and the second neural network 925 and classifying the first set of users using a low-density separation algorithm to optimize the first neural network 920 and the second neural network 925.

In another embodiment, training component 915 may train a first neural network 920 and a second neural network 925 based on the segmentation of the second set of users, where the first neural network 920 maps the user information to an embedding space and the second neural network 925 maps the embedding space to a space of probability vectors corresponding to the multiple categories. Training component 915 may also update the first neural network 920 and the second neural network 925 based on the segmentation of the first set of users.

In another embodiment, training component 915 may train a first neural network 920 and a second neural network 925 based on the segmentation of the second set of objects, where the first neural network 920 maps the object information to an embedding space and the second neural network 925 maps the embedding space to a space of probability vectors corresponding to the multiple categories. Training component 915 may also retrain the first neural network 920 and the second neural network 925 based on the classification of the first set of objects. Training component 915 may also retrain the first neural network 920 and the second neural network 925 based on a reclassification of the first set of objects.

Classification component 920 may classify input data according to a set of categories or labels. The classification component 920 includes the first neural network 925 and the second neural network 930. When the first neural network 925 and the second neural network 930 are updated, the classification component 920 can reclassify the first set of users based on the updated first neural network 925 and the updated second neural network 930. The classification component 920 may also generate a set of feature-label pairs for the first set of users based on the classifying the first set of users, where updating the first neural network 925 and the second neural network 930 including training the first neural network 925 and the second neural network 930 on the set of feature-label pairs for the first set of users. The classification component 920 may be an example of, or include aspects of, the corresponding element or elements described with reference to FIG. 10.

First neural network 925 may be an example of, or include aspects of, the corresponding element or elements described with reference to FIGS. 7 and 10. Second neural network 930 may be an example of, or include aspects of, the corresponding element or elements described with reference to FIGS. 7 and 10.

Separation component 935 may predict category membership propensities for the first set of users using a low-density separation algorithm on the user information for the first set of users mapped to the embedding space. In some examples, the low-density separation algorithm includes a one-vs-rest TSVM. That is, the separation component 935 may segment the first set of users into multiple categories using a low-density separation algorithm.

Separation component 935 may classify the first set of objects into the multiple categories using a low-density separation algorithm based on the mapping. Separation component 935 may also reclassify the first set of objects into the multiple categories using the low-density separation algorithm based on the remapping.

Application component 940 may perform a marketing campaign directed to at least a portion of the first set of users based on the reclassification. Application component 940 may also select relevant information for a portion of the first set of users based on the reclassification. Application component 940 may also transmit the relevant information to the portion of the first set of users.

A processor unit 945 may include an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special-purpose components for modem processing, base-band processing, digital signal processing, or transmission processing. In some examples, the processor may comprise a system-on-a-chip.

A memory unit 950 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and/or a solid-state drive (SSD). Memory may include any combination of readable and/or writable volatile memories and/or non-volatile memories, along with other possible storage devices.

Figure 10:
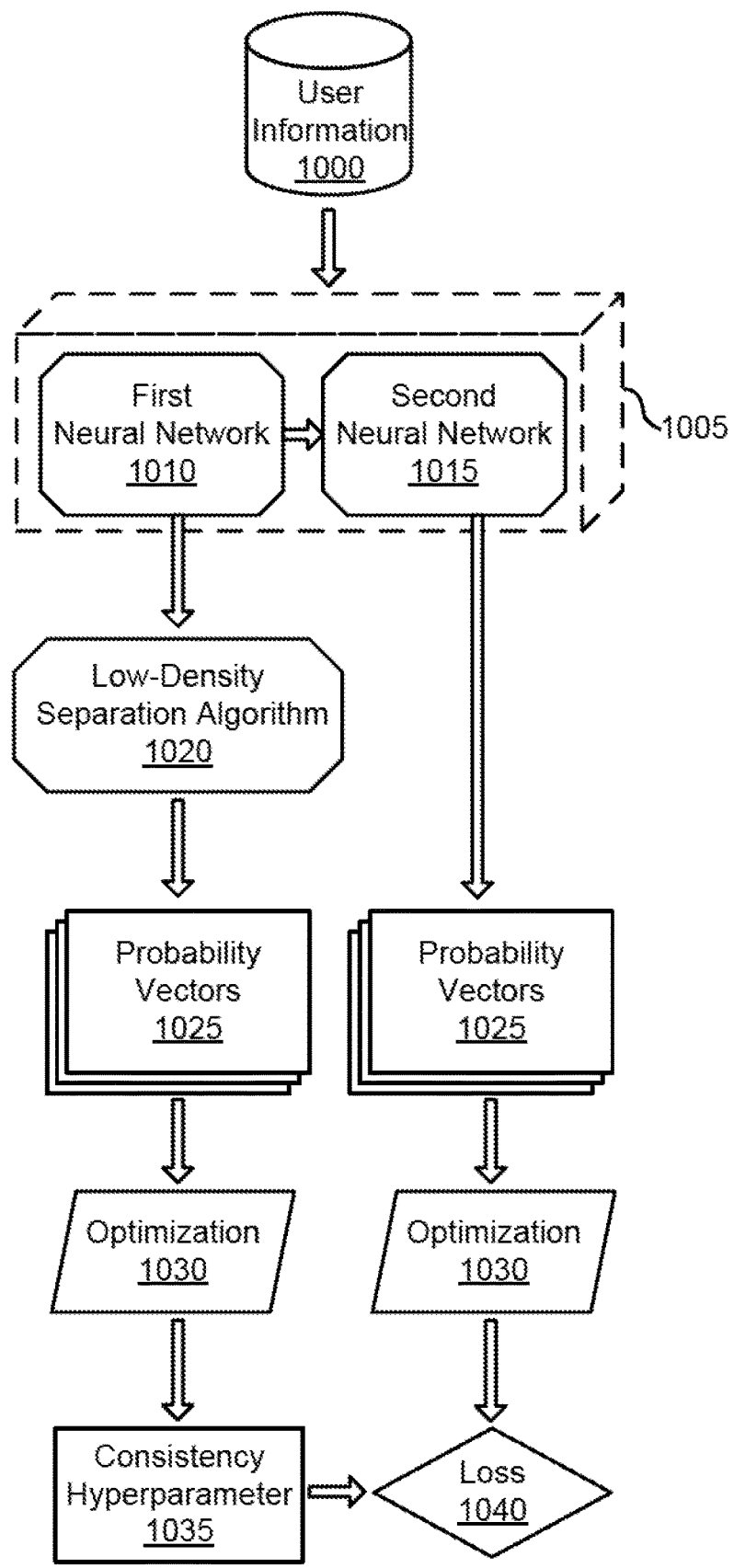
FIG. 10 shows an example of a deep segmentation network architecture according to aspects of the present disclosure.

FIG. 10 shows an example of a deep segmentation network architecture according to aspects of the present disclosure. The example shown includes input 1000, classification component 1005, low-density separation algorithm 1020, probability vectors 1025, optimization 1030, consistency hyperparameter 1035, and loss 1040.

According to one embodiment, the neural network $f$: $\mathbb{R}^d \to \mathbb{R}^m$ has two layers, the first of size 128 and the second of size 32, both with hyperbolic tangent activation. In between these two layers, batch normalization followed dropout is applied at a rate of 0.5 during model training to prevent overfitting. Additionally, the neural network $g$: $\mathbb{R}_m \to \mathbb{P}^c$ may consist of a single layer with 5 units and softmax activation. $\theta$ (resp. $\psi$) denotes the trainable parameters for $f$ (resp. g) and $f_\theta$ (resp. $g_\psi$) denotes $f$ (resp. g) in a manner that stresses the dependence of the neural network on these trainable parameters. Neural network parameters receive Glorot's normal initialization. The network weights for $f$ and g receive Tikhonov-regularization, which decreases with progression through the network. The underlying target distribution is formed by one-hot encoding the labels y; and slightly smoothing these labels. h: $\{1, \ldots, c\} \to \mathbb{P}^c$ may be defined by its components $1 \leq j \leq c$ as $$h(y)_j = \begin{cases} 1 - c \cdot \varepsilon & \text{if } y = j, \\ \varepsilon, & \text{otherwise} \end{cases} \quad (3)$$

where $\varepsilon = 10^{-3}$ is set to be the smoothing parameter. Training starts with the neural network $f_\theta$, to minimize $D_{KL}(h(y_i) \| g_\psi(f_\theta(x_i)))$ on $\mathcal{D}_0$ in batches where $D_{KL}(\cdot \| \cdot)$ denotes the Kullback-Leibler divergence between the true distributions $h(y_i)$ and the inferred distributions $g_\psi(f_\theta(x_i))$. The Adam optimizer is used to maintain different learning rates for each parameter and allows the rates to increase but adapts the rates based on the first two moments from the gradient updates. This optimization on labeled data produces parameters $\theta_0$ for $f$ and $\psi_0$ for g.

The function $f_\theta$, may be a map that produces features well-suited for differentiating between classes. $\tilde{D}_0 = \{(f_{\theta_0}(x), y):(x,y) \in D_0\}$ and $\tilde{D}_1 = \{(f_{\theta_0}(x):(x,) \in D_1\}$ are formed by passing the x-data through this mapping. A number, c, of TSVM's are then trained, one for each class on the labeled data $\tilde{D}_0$ and unlabeled data $\tilde{D}_1$. This produces probability vectors $\hat{p}_i = \ell + 1, \ldots, \ell + u$ for class propensities for the $x_i$ in $\mathcal{D}_1$. For each i,$\hat{p}_i \in \mathbb{P}^c$ is a probability vector with elements corresponding to the likelihood that $x_i$ lies in a given class. $\tilde{D}_1 = \{(x_i, \hat{p}_i)\}$ is formed by pairing $x_i \in D_1$ with a corresponding predicted probability $\hat{p}_i$.

In one embodiment, the learning rate for the Adam optimizer may be set to 1/10th of the initial rate prior to minimizing the mean square error between $g(f(x_i))$ and $\hat{p}_i$ for $(x_i, \hat{p}_i) \in \tilde{D}_1$ for 10 epochs and then minimizing the KL divergence between $h(y_i)$ and $g(f(x_i))$ for 10 epochs. This training starts with neural network parameters $\theta_0$ and $\psi_0$ and produces parameters $\theta_1$ and $\psi_1$. The function $f_{\theta_1}$ is a map that produces features better suited to segmenting classes than those from $f_{\theta_0}$. The x-data is passed through this mapping and the iterative process continues for 6 iterations.

An exponential moving average may be formed from the predictions $g(f(x_i))$ for $x_i \in D_1$ over the iterative steps and this average constitutes the final estimate for the probabilities of interest.

In an example embodiment, for a binary classification problem with labels $y_i \in \{-1, 1\}$, parameters w, b are calculated to minimize the non-convex objective function:

$$J(w,b) = \frac{1}{2}\|w\|^2 + C\Sigma_{i=1}^{l} H(y_i f_{w,b}(x_i)) + C^* \Sigma_{i=i+1} H(|f_{w,b}(x_i)|), \quad (4)$$

where $f_{w,b}: \mathbb{R}^d \to \mathbb{R}$ is the linear decision function $f_{w,b}(x) = w \cdot x + b$, and $H(x) = \max(0, 1-x)$ is the hinge loss function. The hyperparameters C, C* control the relative influence of the labeled and unlabeled data, respectively. The third term is non-convex, corresponding to the unlabeled data. The function J(w,b) is decomposed into the sum of a concave function and a convex function by creating two copies of the unlabeled data, one with positive labels and one with negative labels. The calculation is reduced to an iterative procedure at each step using the concave-convex procedure (CCCP).

Classification component 1005 may be an example of, or include aspects of, the corresponding element or elements described with reference to FIG. 9. The first neural network 1010 and the second neural network 1015 may be a component of the classification component 1005. The first neural network 1010 can include one or more dense neural networks. A dense neural network may be a type of neural network in which the layers are fully connected by the network nodes.

First neural network 1010 and second neural network 1015 may be an example of, or include aspects of, the corresponding element or elements described with reference to FIGS. 7 and 9. Low-density separation algorithm 1020 may be an example of, or include aspects of, the corresponding element or elements described with reference to FIG. 7.

Accordingly, the present disclosure includes the following embodiments.

A method, apparatus and non-transitory medium storing code for user classification with semi-supervised machine learning is described. Embodiments of the method, apparatus and non-transitory medium may receive user information for a first set of users, receiving survey data for a second set of users, wherein the second set of users is a proper subset of the first set of users, training a first neural network and a second neural network based on the second set of users, wherein the first neural network maps the user information to an embedding space and the second neural network maps the embedding space to a space of probability vectors, and wherein each vector in the space of probability vectors corresponds to a user's category membership propensity, mapping the user information for the first set of users to the embedding space using the first neural network, predicting category membership propensities for the first set of users using a low-density separation algorithm on the user information for the first set of users mapped to the embedding space, updating the first neural network and the second neural network based on the prediction, and reclassifying the first set of users based on the updated first neural network and the updated second neural network.

Some examples of the method, apparatus, and non-transitory computer-readable medium described above may further include identifying demographic information for the first set of users. Some examples may further include monitoring user interactions of the first set of users with one or more software products, wherein the user information is based on the demographic information and the user interactions.

Some examples of the method, apparatus, and non-transitory computer-readable medium described above may further include selecting the second set of users from the first set of users. Some examples may further include transmitting a survey to the second set of users based on the selection. Some examples may further include receiving the survey data for the second set of users in response to the survey.

Some examples of the method, apparatus, and non-transitory computer-readable medium described above may further include segmenting the second set of users into a plurality of categories based on the survey data. Some examples may further include generating a set of feature-label pairs for the second set of users based on the segmentation, wherein the first neural network and the second neural network are trained based on the set of feature-label pairs.

Some examples of the method, apparatus, and non-transitory computer-readable medium described above may further include encoding category membership using a one-hot encoding, wherein the set of feature-label pairs is based on the one-hot encoding.

Some examples of the method, apparatus, and non-transitory computer-readable medium described above may further include initializing the first neural network, the second neural network, or both using Glorot initialization. Some examples may further include regularizing the first neural network, the second neural network, or both using Tikhonov regularization.

In some examples, the first neural network comprises a two-layer network with hyperbolic tangent activation. In some examples, the second neural network comprises a single-layer network with softmax activation.

Some examples of the method, apparatus, and non-transitory computer-readable medium described above may further include training the first neural network comprises minimizing Kullback-Leibler divergence between a true distribution and an inferred distribution from the second neural network.

Some examples of the method, apparatus, and non-transitory computer-readable medium described above may further include training the first neural network, and the second neural network comprises adjusting parameters of the first neural network and the second neural network using an Adam optimizer. In some examples, the embedding space comprises fewer dimensions than the user information. In some examples, the low-density separation algorithm comprises a one-vs-rest transductive support vector machine (TVSM).

Some examples of the method, apparatus, and non-transitory computer-readable medium described above may further include generating a set of feature-label pairs for the first set of users based on the classifying the first set of users, wherein updating the first neural network and the second neural network comprises training the first neural network and the second neural network on the set of feature-label pairs for the first set of users.

Some examples of the method, apparatus, and non-transitory computer-readable medium described above may further include repeatedly alternating between training the first neural network and the second neural network and classifying the first set of users using the low-density separation algorithm to optimize the first neural network and the second neural network.

A method, apparatus and non-transitory medium storing code for user classification with semi-supervised machine learning is described. Embodiments of the method, apparatus and non-transitory medium may identify user information for each of a first set of users, selecting a second set of users, wherein the second set of users is a proper subset of the first set of users, collecting additional information for each of the second set of users, segmenting the second set of users into multiple categories based on the additional information, training a first neural network and a second neural network based on the segmentation of the second set of users, wherein the first neural network maps the user information to an embedding space and the second neural network maps the embedding space to a space of probability vectors corresponding to the multiple categories, mapping the user information for the first set of users to the embedding space using the first neural network, segmenting the first set of users into the multiple categories using a low-density separation algorithm, updating the first neural network and the second neural network based on the segmentation of the first set of users, and reclassifying the first set of users based on the updated first neural network and the updated second neural network.

Some examples of the method, apparatus, and non-transitory computer-readable medium described above may further include performing a marketing campaign directed to at least a portion of the first set of users based at least in part on the reclassification.

Some examples of the method, apparatus, and non-transitory computer-readable medium described above may further include selecting relevant information for a portion of the first set of users based at least in part on the reclassification. Some examples may further include transmitting the relevant information to the portion of the first set of users.

A method, apparatus and non-transitory medium storing code for object classification with semi-supervised machine learning is described. Embodiments of the method, apparatus and non-transitory medium may identifying information for a first set of objects, identifying additional information for a second set of objects, wherein the second set of objects is a subset of the first set of objects, classifying the second set of objects into multiple categories based on the additional information, training a first neural network and a second neural network based on the segmentation of the second set of objects, wherein the first neural network maps the object information to an embedding space and the second neural network maps the embedding space to a space of probability vectors corresponding to the multiple categories, mapping the first set of objects to the embedding space using the first neural network, classifying the first set of objects into the multiple categories using a low-density separation algorithm based on the mapping, retraining the first neural network and the second neural network based on the classification of the first set of objects, remapping the first set of objects to the embedding space using the updated first neural network, reclassifying the first set of objects into the multiple categories using the low-density separation algorithm based on the remapping, and retraining the first neural network and the second neural network based on the reclassification of the first set of objects.

Some examples of the method, apparatus, and non-transitory computer-readable medium described above may further include randomly selecting the second set of objects from the first set of objects. Some examples may further include collecting additional information based on the random selection. In some examples, the second set of objects is classified using unsupervised machine learning.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application-specific integrated circuit (ASIC), a field-programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed as computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y. or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method of user classification, comprising:
   receiving user information for a first set of users;
   receiving survey data for a second set of users, wherein the second set of users is a proper subset of the first set of users;
   training a first neural network and a second neural network based on the second set of users, wherein the first neural network maps the user information to an embedding space and the second neural network maps the embedding space to a space of probability vectors, and wherein each vector in the space of probability vectors corresponds to a user's category membership propensity;
   mapping the user information for the first set of users to the embedding space using the first neural network;
   predicting category membership propensities for the first set of users using a low-density separation algorithm on the user information for the first set of users mapped to the embedding space;
   updating the first neural network and the second neural network based on the prediction; and
   reclassifying the first set of users based on the updated first neural network and the updated second neural network.

2. The method of claim 1, further comprising:
   identifying demographic information for the first set of users; and
   monitoring user interactions of the first set of users with one or more software products, wherein the user information is based on the demographic information and the user interactions.

3. The method of claim 1, further comprising:
   selecting the second set of users from the first set of users;
   transmitting a survey to the second set of users based on the selection; and
   receiving the survey data for the second set of users in response to the survey.

4. The method of claim 1, further comprising:
   segmenting the second set of users into a plurality of categories based on the survey data; and
   generating a set of feature-label pairs for the second set of users based on the segmentation, wherein the first neural network and the second neural network are trained based on the set of feature-label pairs.

5. The method of claim 4, further comprising:
   encoding category membership using a one-hot encoding, wherein the set of feature-label pairs is based on the one-hot encoding.

6. The method of claim 1, further comprising:
   initializing the first neural network, the second neural network, or both using Glorot initialization; and
   regularizing the first neural network, the second neural network, or both using Tikhonov regularization.

7. The method of claim 1, wherein:
   the first neural network comprises a two-layer network with hyperbolic tangent activation.

8. The method of claim 1, wherein:
   the second neural network comprises a single-layer network with softmax activation.

9. The method of claim 1, further comprising:
   training the first neural network comprises minimizing Kullback-Leibler divergence between a true distribution and an inferred distribution from the second neural network.

10. The method of claim 1, further comprising:
    training the first neural network and the second neural network comprises adjusting parameters of the first neural network and the second neural network using an Adam optimizer.

11. The method of claim 1, wherein:
    the embedding space comprises fewer dimensions than the user information.

12. The method of claim 1, wherein:
    the low-density separation algorithm comprises a one-vs-rest transductive support vector machine (TSVM).

13. The method of claim 1, further comprising:
    generating a set of feature-label pairs for the first set of users based on the classifying the first set of users, wherein updating the first neural network and the second neural network comprises training the first neural network and the second neural network on the set of feature-label pairs for the first set of users.

14. The method of claim 1, further comprising:
    repeatedly alternating between training the first neural network and the second neural network and classifying the first set of users using the low-density separation algorithm to optimize the first neural network and the second neural network.

15. A method of user classification, comprising:
    identifying user information for each of a first set of users;
    selecting a second set of users, wherein the second set of users is a proper subset of the first set of users;
    collecting additional information for each of the second set of users;
    segmenting the second set of users into multiple categories based on the additional information;
    training a first neural network and a second neural network based on the segmentation of the second set of users, wherein the first neural network maps the user information to an embedding space and the second neural network maps the embedding space to a space of probability vectors corresponding to the multiple categories;
    mapping the user information for the first set of users to the embedding space using the first neural network;
    segmenting the first set of users into the multiple categories using a low-density separation algorithm;
    updating the first neural network and the second neural network based on the segmentation of the first set of users; and
    reclassifying the first set of users based on the updated first neural network and the updated second neural network.

16. The method of claim 15, further comprising:
performing a marketing campaign directed to at least a portion of the first set of users based at least in part on the reclassification.

17. The method of claim 15, further comprising:
selecting relevant information for a portion of the first set of users based at least in part on the reclassification; and
transmitting the relevant information to the portion of the first set of users.

18. A method of object classification, comprising:
identifying information for a first set of objects;
identifying additional information for a second set of objects, wherein the second set of objects is a subset of the first set of objects;
classifying the second set of objects into multiple categories based on the additional information;
training a first neural network and a second neural network based on the segmentation of the second set of objects, wherein the first neural network maps the object information to an embedding space and the second neural network maps the embedding space to a space corresponding to the multiple categories;
mapping the first set of objects to the embedding space using the first neural network;
classifying the first set of objects into the multiple categories using a low-density separation algorithm based on the mapping;
retraining the first neural network and the second neural network based on the classification of the first set of objects;
remapping the first set of objects to the embedding space using the updated first neural network;
reclassifying the first set of objects into the multiple categories using the low-density separation algorithm based on the remapping; and
retraining the first neural network and the second neural network based on the reclassification of the first set of objects.

19. The method of claim 18, further comprising:
randomly selecting the second set of objects from the first set of objects; and
collecting the additional information based on the random selection.

20. The method of claim 18, wherein:
the second set of objects is classified using unsupervised machine learning.

* * * * *